United States Patent [19]
Friese et al.

[11] Patent Number: 6,013,750
[45] Date of Patent: *Jan. 11, 2000

[54] AEROBIC ADHESIVE

[75] Inventors: Carsten Friese, Hamburg; Frank George, Hannover; Dieter Rademacher, Wunstorf; Thomas Huver, Duesseldorf; Frank Bergmann, Garbsen, all of Germany

[73] Assignee: Henkel Kommanditgesellschaft auf Aktien, Duesseldorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/649,588

[22] PCT Filed: Nov. 22, 1994

[86] PCT No.: PCT/EP94/03847

§ 371 Date: Jul. 9, 1996

§ 102(e) Date: Jul. 9, 1996

[87] PCT Pub. No.: WO95/14720

PCT Pub. Date: Jun. 1, 1995

[30] Foreign Application Priority Data

Nov. 26, 1993 [DE] Germany ............... 43 40 239
May 19, 1994 [DE] Germany ............... 44 17 467

[51] Int. Cl.$^7$ ................... C08F 126/02
[52] U.S. Cl. ........... 526/301; 526/218.1; 526/219.2; 526/219.3
[58] Field of Search ............ 526/301, 218.1, 526/219.2, 219.3

[56] References Cited

U.S. PATENT DOCUMENTS

Re. 29,131  2/1977  Smith et al. ............... 22/16
3,425,988  2/1969  Gorman et al. ............. 260/47
4,010,152  3/1977  MacLeay et al. ........... 260/192

FOREIGN PATENT DOCUMENTS 0539030     4/1993  European Pat. Off. .
2508924     1/1983  France .
2163443     2/1986  United Kingdom .
WO9110687   7/1991  WIPO .
WO9301218   1/1993  WIPO .

OTHER PUBLICATIONS

"Ullmann Encykloädie der technischen Chemie" 4th edition, vol. (1983), pp. 421 to 424.

W. Kern, Makromol. Chem. 1,249 (1947).

C. Srna, Angew makromol. Chem. 9,165 (1969).

Houben–Weyl, "Methoden der organischen chemie", vol. 14/1, 263 to 297., 1961.

Primary Examiner—Bernard Lipman
Attorney, Agent, or Firm—Ernest G. Szoke; Wayne C. Jaeschke; Real J. Grandmaison

[57] ABSTRACT

The invention pertains to an aerobically curing composition comprising free-radical polymerizable compounds, an activator system, and optionally conventional additives, characterized in that said composition contains as said free-radical polymerizable compounds at least one polyurethane (meth)acrylate one or more (meth)acrylate comonomers; wherein said composition contains from 20 to 80% by weight of said polyurethane (meth)acrylate and from 80 to 20% by weight of said (meth)acrylate comonomer(s), based on the total of polymerizable compounds, and said activator system is a hydrazone activator system, as well as the preparation and use of said composition.

44 Claims, 3 Drawing Sheets

AEROBIC ADHESIVE

BACKGROUND OF THE INVENTION

1. Field of the Invention

The present invention pertains to an aerobically curing composition, the preparation thereof and use thereof.

2. Discussion of Related Art

Bonded joints can be found in household utensil, electrical, electronics, furniture, sports article, construction (indoor and outdoor), ceramics industries and in automobile manufacture including their subcontractors. The machine-building trade benefits from adhesive properties as well as mountings or installation technologies where sealing functions must also be served. In addition to combinations of similar materials, such as steel, aluminum, brass, copper, painted metallic surfaces, wood, glass, PVC, PC (polycarbonate), and ABS, pairs of different materials are particularly important in terms of adhesive properties. In such composite bondings, the limit of the performance of known adhesive systems is frequently reached due to different thermal expansion behaviors or adhesion loss, also with materials such as ferrite or ceramics. In some applications, the adhesives must have additional damping properties or must not have corrosion-promoting properties at different electrochemical potentials.

Limits of application are known for the known adhesive systems, such as two-component epoxy resins, cyanoacrylates, dispersion, contact, two-component acrylate, two-component polyurethane or anaerobically curing adhesives, with respect to gap-filling performance, elasticity, automatical metering, heat resistance, volatility and ageing properties.

Further, short cycle times are predominantly required for bondings of a variety of materials in industrial automated production. Many adhesive formulations require waiting times for the activation of the adhesive (prior to and after joining) which cannot be accepted in industrial automated production.

Further, metering and storing of the adhesives is very important. According to the prior art, a flexible plastic container is filled with an adhesive or sealant (e.g. anaerobic adhesive) and inserted into a compressed-air vessel comprising a fixture. Extraction of the containers, in which an ascending pipe has been inserted, is performed by admitting compressed air in the compressed-air vessel. By means of a hose pipe, the product is brought to the corresponding site of application and metered with a metering valve. By this method, the containers cannot be discharged to less than 10% of residual contents. Also, with anaerobic adhesives, the additional uptake of compressed air by the product has a disadvantageous effect on metering. For metering aerobic adhesives, there have been no possibilities of automatic metering from tubes and flexible plastic containers to date.

In order to shorten the period between the application of the adhesive and the joining of the parts to be connected, the oxygen can be added to the adhesive already prior to its application. This requires the inclusion of a mixing chamber in which the oxygen, whether in pure form or in the form of air, is added to the adhesive with more or less pressure. This mixing chamber should be positioned between the product outlet and the distributing valve. Preferably it is incorporated in the distributing valve. Also, it is advantageous for the mixing chamber to be heatable such that the time of air contact can be adapted to the respective bonding process. Thus, it is possible to adjust the duration of the bonding process to the cycle times of a series production.

Therefore, it is the object of the present invention to provide a one-component, aerobically curing adhesive composition which rapidly forms a high-strength polymer resistant to heat, ageing and moisture and which is useful for bonding a wide variety of similar materials and different materials (composites).

Further, the composition should be apt to be used in a special process in which the air-contacting periods for the activation of the adhesive are still shortened so that it can also be used in industrial production involving shorter cycle times.

In addition, it has been another object of the invention to provide a system for storing and metering the aerobic adhesive according to the invention.

The first object has been achieved, according to the invention, by an aerobically curing composition comprising free-radical polymerizable compounds, an activator system, and optionally conventional additives, characterized in that said composition contains as said free-radical polymerizable compounds A) at least one polyurethane (meth)acrylate of the general formula:

wherein $R^1$ is hydrogen or a methyl group;

$R^2$ is a linear or branched chain alkyl group containing from 2 to 6 carbon atoms or alkylene oxide containing from 4 to 21 carbon atoms;

n is 2 or 3; and $R^3$, for n=2, is:

wherein m is from 0 to 10;

$R^4$ is a) a polycaprolactonediol residue;

b) a polytetrahydrofurfuryldiol residue;

c) a diol residue derived from a polyesterdiol which is characterized by a C:O ratio of >2.6, a C:H ratio of <10, and a molecular weight of from 1000 to 20,000; or d) a dial residue derived from a PES dial which is liquid at 20° C. and has a molecular weight of from 4000 to 10,000 by HPRC; and $R^3$, for n=3, is:

wherein $R^5$ is a trial residue of a linear or branched chain trihydric alcohol containing from 3 to 6 carbon atoms, and p is from 1 to 10; and Q and Q' independently are aromatic, aliphatic or cycloaliphatic groups containing from 6 to 18 carbon atoms which are derived from diisocyanates or diisocyanate mixtures; and B) one or more (meth)acrylate comonomers;

wherein said composition contains from 20 to 80% by weight of said polyurethane (meth)acrylate and from 80 to 20% by weight of said (meth)acrylate comonomer(s), based on the total of polymerizable compounds, and said activator system is a hydrazone activator system.

BRIEF DESCRIPTION OF THE DRAWINGS

FIG. 2 shows a container for storing and metering aerobically curing adhesives according to the invention. The flexible plastic container 5 (oxygen impermeable) is placed or suspended in pressure tank 7 by means of a fixture 6. The connection between the flexible plastic container 5 and the pressure tank lid 8 is made via a screwable adapter 9 whereby a seal towards the compressed air is achieved. When applied, the adhesive composition is pressed through this adapter 9 and through a tube 10 without getting into contact with the compressed air. The conventional screw joints, hoses and valves can be fitted at the product container outlet 11.

The compounds of the above-mentioned formula (I) can be prepared according to per se known prior art methods by reacting an acrylate ($R^1$=H) or methacrylate ($R^1$=$CH_3$) containing hydroxy groups in the ester group with compounds containing isocyanate groups to form urethane groups.

The acrylates or methacrylates according to the invention are hydroxyalkyl acrylates or methacrylates wherein the alkyl groups can be linear or branched chain and contain from 2 to 6 carbon atoms. According to the invention, the esters of acrylic acid and methacrylic acid with polyethylene glycol and/or polypropylene glycol may also be used. Such acrylates or methacrylates contain from 4 to 21 carbon atoms in the ester group, corresponding to from 2 to 10 ethylene oxide units and from 1 to 7 propylene oxide units. The preparation of such esters is known to one skilled in the art.

Suitable acrylates or methacrylates are those for which $R^2$ is an ethylene, propylene, isopropylene, n-butylene, isobutylene group or ethylene oxide or propylene oxide unit.

For the reaction of the isocyanates with the acrylates or methacrylates bearing hydroxy groups, there are preferred, however, hydroxyethyl acrylate, hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate, 6-hydroxy-hexyl methacrylate, polyethylene glycol acrylate, polyethylene glycol methacrylate, polypropylene glycol acrylate, and polypropylene glycol methacrylate.

If n=2, the compounds of the above-mentioned general formula (I) are products of the reaction of the above-mentioned acrylates or methacrylates containing hydroxy groups with isocyanates which can be obtained by reaction of appropriate diols with diisocyanates. The diols are a) polycaprolactonediols, b) polytetrahydrofurfuryldiols, and c) special polyesterdiols. The molar ratio in the reaction of the diols with the diisocyanates can vary within the range of from 1:2 to 1:1.1.

a) Polycaprolactonediols can be obtained according to per se known methods by ring-opening polymerization of caprolactone with appropriate diols wherein the ratio of caprolactone to diol is from 1 to 20, i.e. 2 to 40 moles of caprolactone is employed per mole of diol. The molecular weight of the polycaprolactonediols is from 200 to 4000.

As the diols, there can be used, in particular, linear or branched chain dihydric alcohols containing from 2 to 6 carbon atoms which are selected from ethylene glycol, 1,2-propanediol, 1,3-propanediol, 1,2-, 1,3- or 1,4-butanediol, 1,5-pentanediol, 2-methyl-1,4-butanediol, 2,2-dimethyl-1,3-propanediol, 1,2-or 1,6-hexanediol, 1,10-decanediol.

Subsequently, the products of the reaction between the diol and the caprolactone are reacted with aromatic, aliphatic or cyclic diisocyanates according to methods known to those skilled in the art. Suitable diisocyanates from which Q and independently also Q' are derived are selected from 2,4-toluenediisocyanate, 2,6-toluenediisocyanate, 4,4'-diphenylmethanediisocyanate (MDI), 4,4'-dicyclohexyldiisocyanate, meta- and para-tetramethylxylene-diisocyanate, 3-isocyanatomethyl-3,5,5-trimethylcyclohexylisocyanate (isophorone diisocyanate), hexamethylenediisocyanate, 1,5-naphthylenediisocyanate, dianisidinediisocyanate, bis(2-isocyanatoethyl)bicyclo [2.2.1]hept-5-ene-2,3-dicarboxylate, 2,2,4- and 2,4,4-trimethylenehexamethylenediisocyanate, and mixtures thereof.

Subsequently, the reaction product from the diol, the caprolactone and the diisocyanate is reacted with the acrylate or methacrylate containing hydroxy groups according to per se known methods to give the polyurethane (meth) acrylate.

b) Build-up of the compounds derived from polytetrahydrofurfuryldiol is performed, in principle, according to the same scheme as described under a). First, polytetrahydrofurfuryldiol is reacted with one of the diisocyanates mentioned above under a), and the reaction product is reacted with the acrylates or methacrylates containing hydroxy groups already mentioned under a) to give the polyurethane (meth)acrylate. With respect to the method for reacting diols with diisocyanates, reference is made to the respective technical literature known to those skilled in the art. The molecular weight of the products is between 200 and 4500.

c) Particularly good properties, especially with respect to hydrophobization, are achieved by employing polyurethane (meth)-acrylates based on special polyesterdiols. These polyurethane (meth)acrylates have a particular elastifying effect.

These polyurethane (meth)acrylates are compounds of the general formula II:

[$H_2C$=$CR^1$—C (=O)—O—$R^2$—O—C(=O)—NH—Q—NH—Q—NH—C (=O)]$_2${—O—$R^4$—O—C(=)—NH—Q'—NH—C(=O)}$_m$—O—$R^4$—O—]  (II)

wherein m, $R^1$, $R^2$, Q and Q' are the same as defined above. $R^4$ represents polyesterdiol residues derived from polyesterdiols which are characterized by a C:O ratio of >2.6, preferably>3.0, and a C:H ratio of <10. Further, these polyesterdiols are characterized by a molecular weight of from 1000 to 20,000, in particular from 1000 to 10,000.

The preparation of these special polyesterdiols is performed by reacting long-chain diols, in particular dimerdiol (hydrogenated dimer fatty acid), with shorter-chain dicarboxylic acids containing from 4 to 8 carbon atoms or their anhydrides, in particular succinic acid or succinic anhydride. The polyesterdiols can also be prepared by reacting shorter-chain diols containing from 4 to 8 carbon atoms, in particular 1,6-hexane-diol, with long-chain fatty acids, in particular dimer fatty acid mixture of dimerized fatty acids of acyclic and cyclic dicarboxylic acids containing an average of 36 carbon atoms. However, there can also be used mixtures of long-chain diols with shorter-chain diols, such as, in particular, mixtures of hexane diol and polyethylene glycol, or dimerdiol and diethylene glycol.

Generally, particularly preferred diols are linear or branched chain $C_2$ to $C_{44}$ alkyldiols, such as ethylene glycol, 1,2- or 1,3-propylene glycol, 1,2-, 1,3- or 1,4-butanediol, neopentyl glycol, 1,2- or 1,6-hexanediol, 1,10-decanediol, 1,12-octadecanediol. However, cyclic $C_6$ to $C_{44}$ alkyldiols may also be used.

Diols containing ether groups are further preferred, such as, for example, di-, tri- or tetraethylene or -propylene glycol or their oligomeric homologues.

Generally, particularly preferred dicarboxylic acids are linear or branched chain $C_2$ to $C_{44}$ alkyldicarboxylic acids, such as oxalic acid, malonic acid, succinic acid, glutaric acid, adipic acid, pimelic acid, suberic acid, azelaic acid, nonanedicarboxylic acid, decanedicarboxylic acid, undecanedicarboxylic acid, or technical mixtures thereof. In the reaction with the diols, there may also be employed unsaturated $C_4$ to $C_{44}$ dicarboxylic acids, such as maleic acid, fumaric acid, itaconic acid, or aconitic acid.

The esterification can be performed according to per se known methods in the presence of a catalyst in an appropriate solvent at an elevated temperature with azeotropic removal of the reaction water. A preferred catalyst is stannous octoate, and a preferred solvent is xylene.

The polyesterdiols thus obtained are then reacted with one of the diisocyanates mentioned above under a) and subsequently reacted with the acrylates or methacrylates containing hydroxy groups already mentioned under a) to give the polyurethane (meth)acrylate. One or more of these polyurethane (meth)acrylates based on the special polyesterdiols can be employed in admixture with activators and optionally other conventional additives as an adhesive composition.

If n=3, the compounds of the above-mentioned general formula (I) are products of the reaction of the above-mentioned acrylates or methacrylates containing hydroxy groups with isocyanates which can be obtained by reaction of appropriate linear or branched chain trihydric alcohols (triols) containing from 3 to 6 carbon atoms with caprolactone and subsequent reaction with diisocyanates Polycaprolactonetriols can be obtained according to per se known methods by ring-opening polymerization of caprolactone with appropriate triols wherein the ratio of caprolactone to triol is from 1 to 10, i.e. 3 to 30 moles of caprolactone is reacted per one mole of triol.

As the triols, there can be used, in particular, those selected from glycerol, 1,2,4-butanetriol, trimethylolpropane (2-hydroxy-methyl-2-ethyl-1,3-propanediol), and tri-methylolethane (2-methyl-2-hydroxymethyl-1,3-propanediol). Subsequently, the products of the reaction of the triol and the caprolactone are reacted with the diisocyanates mentioned under a) according to methods known to those skilled in the art. There-after, the reaction product from the triol, the caprolactone and the diisocyanate is reacted with the acrylate or methacrylate containing hydroxy groups according to per se known methods to give the polyurethane (meth)acrylate.

The adhesive composition may further contain one or more acrylate or methacrylate comonomers. These monomers are selected from allyl acrylate, allyl methacrylate, methyl acrylate, methyl methacrylate, 2-hydroxyethyl acrylate, 2-hydroxyethyl methacrylate, 2- or 3-hydroxypropyl acrylate, 2- or 3-hydroxypropyl methacrylate, 6-hydroxyhexyl acrylate, 6-hydroxyhexyl methacrylate, benzyl methacrylate, phenylethyl methacrylate, 2-phenoxyethyl methacrylate, morpholinoethyl methacrylate, glycidyl methacrylate, piperidylacrylamide, neopentyl methacrylate, cyclohexyl methacrylate, tert.-butyl methacrylate, and tetrahydrofurfuryl methacrylate, or mixtures thereof. Dimethacrylates, such as TEGDMA, in particular, may also be used.

Preferably, the composition according to the invention contains from 20 to 70% by weight of the polyurethane (meth)acrylate and from 80 to 30% by weight of the (meth) acrylate comonomer, based on the total of polymerizable compounds.

The adhesive compositions according to the invention are employed as free-radical polymerizable one-component systems. At any rate, however, an initiator or activator system is used which initiates the polymerization at olefinically unsaturated systems. Such activators have the ability to be activatable by contact with ambient air, and in preferred embodiments such activation is to occur already at room temperature. Such activator systems generally consist of an initiator component and a promoter component. The composition according to the invention can be employed as a one-component or two-component system. Preferably, it is employed as a one-component adhesive system. It is to have a long shelf-life, to be plastic in its application form, in particular pastelike to liquid, and have a sufficient pot-life to be worked, but then cure in a dimensionally stable manner by simple action of ambient air. The one-component adhesive systems must be kept protected from contact with air until used.

Within the scope of the invention, hydrazones have been used as the initiator or major component in activator systems for the curing of the unsaturated compounds by means of ambient air. These hydrazone compounds are preferably employed together with metallic compounds for acceleration which are at least partially soluble in the system.

The hydrazone components which are preferably employed according to the invention respond to the following general formula III:

$$R^{10}R^6C=N-NH-R^7 \qquad (III)$$

In this embodiment, the residues $R^{10}$, $R^6$ and $R^7$ in this general formula (III) have the following meanings:

$R^{10}$ is a linear, branched chain or cyclic alkyl residue which may be substituted or an aryl residue which may be substituted.

$R^6$ may be the same as $R^{10}$ or different and is hydrogen, a linear, branched chain or cyclic alkyl residue which may be substituted or an aryl residue which may be substituted.

In a special embodiment, residues $R^{10}$ and R6 may also, together with the adjacent carbon atom to which they are bound, form a cycloaliphatic residue which may be substituted.

Residue $R^7$ is again a linear, branched chain or cyclic alkyl residue which may be substituted or an aryl residue which may be substituted.

At least any two of residues $R^{10}$, $R^6$ and $R^7$ or all may be the same, but they may also be structurally different from each other. As the alkyl residues, there are considered, in particular, linear and/or branched chain alkyl residues containing up to 40 carbon atoms, preferably up to about 20 carbon atoms. The minimum number of carbon atoms of cyclic residues is determined by the stability of the corresponding ring system. A preferred lower limit is 5 and in particular 6 carbon atoms.

Residues $R^{10}$, $R^6$ and $R^7$ may be unsubstituted or substituted, It is to be considered that the reactivity of the activator system may be influenced to some extent by the kind of substitution of these residues and in particular of residue $R^7$. If residue $R^7$ is an aromatic system, for example, in particular a phenyl residue, then an acceleration of the reaction may be achieved by appropriate substitution of this phenyl residue, i.e. by providing per se known electron-releasing substituents at this phenyl residue in $R^7$.

Electron-releasing and thus reaction-accelerating substituents are, for example, alkyl, alkoxy and/or halogen substituents at the phenyl residue in $R^7$; inversely, strongly electron-withdrawing substituents, such as the $-NO_2$ group, have a retarding effect on the reaction course. With respect to such electron-releasing and electron-withdrawing effects by substitution and the structure of the respective substituents, an extensive general technical knowledge exists to which reference is made herein.

For more details, in particular with respect to the preparation of such hydrazones, see WO-A-91/10687.

Further, hydrazones of the following general formula:

may be employed wherein q is a number from 1 to 3;

$R^8$ is H or an alkyl group containing up to 40 carbon atoms; and $R^9$ is independent of the other substituents and is H or an aromatic or aliphatic group containing up to 40 carbon atoms.

These hydrazone compounds are mono-, di- or trifunctional. Residues $R^8$ and $R^9$ are preferably linear and/or cyclic alkyl groups containing up to 40 carbon atoms, in particular from 3 to 8 carbon atoms. At least one $R^9$ residue per molecule should be such an alkyl group. Residues $R^8$ and $R^9$ may be unsubstituted or substituted. It is to be considered that the reactivity of the activator system may be influenced to some extent by the kind of substitution of these residues, in particular of residue $R^9$. If an aromatic system is present, for example, in particular a phenyl residue, then an acceleration of the reaction may be achieved by appropriate substitution of this phenyl residue, i.e. by providing per se known electron-releasing substituents at this phenyl residue in $R^9$.

Electron-releasing and thus reaction-accelerating substituents are, for example, alkyl, alkoxy and/or halogen substituents at the phenyl residue in $R^9$. Inversely, strongly electron-withdrawing substituents, such as the $-NO_2$ group, have a retarding effect on the reaction course. With respect to such electron-releasing and electron-withdrawing effects by substitution and the structure of the respective substituents, an extensive general technical knowledge exists to which reference is made herein.

Residue $R^8$ of the general formula may also serve to influence the reaction rate by selecting its constitution and kind of substitution, if any.

The extraordinary wide variety of the particular nature of residues $R^8$ and $R^9$ in the compounds of the general formula can be seen from the U.S. Pat. No. 4,010,152, namely the formula representations in the columns 6 to 14. Here, the hydrazone compounds are represented already in the form of their hydroperoxides which are also formed in situ according to the invention in the course of the reaction when atmospheric oxygen is admitted. The extensive statements of this latter document with respect to the particular nature of the hydrazone compounds and the hydroperoxides which are produced therefrom in situ also apply to the teaching of the present invention in connection with the definition of the compounds of the general formula. For convenience, reference is made to this detailed printed representation together with the specification of the invention. Of course, the benzene ring may also contain other substituents unless interfering with the initiator function.

Concrete examples include acetophenone methylhydrazone (q=1, $R^8$=$R^9$=$CH_3$), acetophenone t-butylhydrazone (q=1, $R^8$=$CH_3$, $R^9$=$C(CH_3)_3$).

For more details, in particular with respect to the preparation of such hydrazones, see WO-A-93/01218.

As the metallic compounds which are at least partially soluble in the system, there are employed primarily compounds of metals which can exist in several valence states. Selected representatives of transition metals may be particularly active. The metal may be selected, inter alia, to determine the rate of polymerization initiation. Components which are highly active at room temperature are derived, for instance, from copper, cobalt, vanadium and/or manganese. Iron compounds, however, are particularly important, being fair reaction accelerators.

For working at room temperature which is especially advantageous in many fields of application, iron, cobalt and/or manganese compounds are particularly useful, optionally in admixture with other metallic components, such as lead, cerium, calcium, barium, zinc and/or zirconium compounds. Reference will be made here to the relevant technical literature, for example, cf. the publication in "Ullmann Encyklopädie der technischen Chemie", 4th edition, volume 23 (1983), pages 421 to 424, and literature cited therein.

The metals concerned are employed in the form of such compounds that they are at least partially soluble in the total system. There are considered both soap-type metallic compounds and other types of bonding, in particular those with complex bonding to organic residues. In typical embodiments, there are used appropriate metal naphthenates or metal acetylacetonates. However, if inorganic salts are sufficiently soluble in the system, such inorganic systems may also be used. A typical example thereof is iron chloride which exhibits a significant accelerating action when employed in the system according to the invention.

It may be convenient to employ the metallic compounds respectively in a low valence state of the metal, i.e., for example, as cobalt(II) or manganese(II). In other instances, it may also be useful to employ a metallic compound with a higher valence state of the metal. Thus, for instance, iron may also be used in the form of ferric ($Fe^{3+}$) compounds.

Reductive agents having accelerating actions may also be included in the activator component, if desired. They are employed in conventional redox systems for polymerization initiation. Reference will be made to the relevant technical literature, for example, W. Kern, Makromol. Chem. 1, 249 (1947), and C. Srna, Angew. makromol. Chem. 9, 165 (1969), as well as the general technical knowledge as described, for example, in Houben-Weyl, "Methoden der organischen Chemie", volume 14/1, 263 to 297.

The class of alpha-hydroxyketones, represented, for example, by butyroin, benzoin or acetoin, has been found to be particularly active. It is important that although this class of substances can serve an essential reaction-accelerating function in the activator systems employed according to the invention, their use is not indispensable.

Initiators or activator systems consisting of the main components described herein, hydrazone compound, metallic dry substance which is at least partially soluble, and/or optionally used accelerator, may be employed instead of the peroxide-type initiator systems.

In the compositions of the invention, the peroxide and hydrazone activator mixtures preferably make up not more than about 15% by weight, in particular not more than about 10% by weight, based on the total system. Depending on the activity of the components employed, the weight of the activator mixture can be highly reduced, for instance, to the order of about 0.1% by weight or at least to about 0.5% by weight. It may be particularly useful for the amount of the activator system to be at least about 1% by weight, preferably up to about 8% by weight.

The three above-mentioned components of the hydrazone activator system may preferably be used in the following proportions: hydrazone compounds: at least about 0.1% by weight, suitably from 0.5 to 7.5% by weight, preferably from 1 to 4% by weight; metal of soluble metallic compound: from 0 to a few % by weight, suitably about 50 ppm to 1% by weight, preferably more than 100 ppm, e.g. 1000 to 5000 ppm; reductive agent: from 0 to 5% by weight, preferably from 1 to 3% by weight, respectively based on the total mixture.

In order to control the course of the reaction and/or the pot-life, inhibitors and/or stabilizers may be included in a per se known way to prevent premature triggering of the free-radical reaction. The amount thereof is determined by the intended purpose. It can be established easily in each instance by technical considerations and/or preliminary experiments. The stabilizers employed will usually not exceed a few percent, e.g. about 2 to 5% by weight, of the total mixture and are generally below 1% by weight, based on the total mixture.

The invention respectively allows the formulation of optimized adhesive compositions. Within the scope of the invention, soluble and/or insoluble fillers, elasticators, thickeners, thixotropic agents, pigments, adhesion promoters, stabilizers and the like may be included without jeopardizing the function of the compositions according to the invention. Of course, it is required to ensure by appropriately selecting the additives and fillers that interference with the interaction of the activator components is excluded. This is subject to general chemical knowledge. For inhibiting the systems according to the invention, several per se known mechanisms are available. The following basic types will be mentioned:

1. Stabilization towards $O_2$, addition of antioxidants; and
2. Stabilization towards free radicals, addition of free-radikal inhibitors.

Typical stabilizer components included in the general chemical knowledge will be listed in the following. In parentheses after each particular compound, there is stated to which mechanism the stabilizer respectively belongs:

Pyrogallol (1), $O_2$-inhibited acrylates (1), hydroquinone (1,2), hydroquinone monomethyl ether (1,2), butylhydroxytoluene (2), and phenothiazine (2). Compounds of the triphenylphosphine type as well as NaI and $I_2$ may be particularly important in stabilizing the system towards undesirable premature reaction.

The composition according to the invention can be used as an aerobically curing adhesive system, as a brushable agent for surface coating with polymerizable, especially solvent-free, paints in terms of brushable air-drying paint systems, for the preparation of molded parts with reaction initiation by the action of ambient air, for example, based on styrene/unsaturated polyester resins, and as a sealant and in printing inks.

For the preparation of the compositions according to the invention, the free-radical polymerizable compounds are homogenized in a stirring apparatus together with the activator system and the optional further additives in desired proportions. In the case of one-component adhesive compositions, care is to be taken that homogenization is performed with exclusion of atmospheric oxygen. To achieve this, it has been found convenient to evacuate and then aerate with nitrogen the stirring apparatus with the polymerizable compounds prior to the addition of the last activator component (with combinations of hardener/accelerator) This procedure may be repeated several times, if desired.

The compositions according to the invention are liquid or pastelike and the corresponding cured substances have good resistance to cold, heat and moisture. In long-term storage, beneficial properties (no crystallization, discoloring or separation) have been established considering the cloud and clear points; an excellent adhesion has been found on glass, ceramics, metals, plastics, and cellulose-containing materials, such as wood or paper. This is demonstrated, in particular, by the tensile shear strength determined on iron sheets according to DIN 53281 (preparation of the test specimens) and DIN 52283 (determination of tensile shear strength).

In the case of plastics, such as PE, PP, POM, PA, PS, SAN, and PMNA, the tensile shear strength can be still increased by a pretreatment. Particularly useful is a plasma, corona or flame pretreatment of the substrate which has been degreased, e.g. with ethanol. The conditions for a low-pressure plasma pretreatment are e.g. a GHz processor with 300 W of performance, process gas: oxygen, pressure: 0.2 mbar, time: 5 minutes.

The compositions according to the invention, which can be adjusted to have different viscosities, depending on their comonomer contents, have been employed to prepare aerobically curing one-component reactive adhesives. Acetophenone tert.-butylhydrazone has been shown to be the most suitable initiator. In the examples, adhesives having long shelf-lives were prepared by using sodium iodide, iodine and iron acetylacetonate and tested in tensile shear test series on standard materials [steel, aluminum, copper, brass, glass, ceramics, wood (limba, balsa, beech, pine), rigid PVC, PC, ABS]. For testing the suitability as a "one-component composite adhesive", various tensile shear test series have been performed. The tests for gap-bridging property and ageing resistance (heat resistance, testing under humid and changing climatic conditions) had also positive results. The tensile shear test series according to DIN protocol listed in the examples show that the adhesive system developed is suitable for a wide variety of applications.

Special attention should be drawn to the use of the adhesive systems according to the invention in the preparation of stereo equipment, in particular loudspeakers. This application has been tested by bonding of specimens since the horn membrane made from paper and the phenol/formaldehyde resin soaked cotton soaked with phenol-formaldehyde resin are made of absorbent and flexible materials. Such materials cannot be tested in a tensile shear test according to the DIN protocol. For testing the suitability of the adhesive, a mid-frequency loudspeaker was prepared manually. The composite bondings performed, i.e. aluminum moving coil/centering cotton soaked with phenol-formaldehyde resin, aluminum basket/bead, aluminum basket/centering cotton soaked with phenol-formaldehyde resin, horn membrane made of paper/aluminum moving coil, braided wires made of copper/horn membrane made of paper, were examined manually without a negative result. Digital amplifiers lead to highly loaded loudspeakers which results in a high heat load at the moving coil and at the neck of the horn membrane, especially if the moving coil is made of aluminum. Therefore, this bonding was tested under temperature load in a drying cupboard (3 h/180° C.). After cooling to room temperature, the bonding was subjected to a manual tensile load, while observing the break of the membrane material. The high-strength and yet flexible bonding joint also allows the use at the magnet system of the loudspeaker.

The invention further pertains to the use of the adhesive composition according to the invention by which it is possible to further reduce the air contact times (ACT, the time required to absorb oxygen from the ambient air) which are necessary for the activation of the adhesive and thus to achieve shorter cycle times. Accordingly, the invention pertains to the use of the composition according to the invention for the bonding of materials with the aerobically curing adhesive composition according to the invention, characterized by applying the adhesive composition to at least one of the material surfaces to be connected;

heating the materials at the surface provided with the adhesive composition during the contact of the adhesive composition with atmospheric oxygen at a temperature of from 40 to 50° C.;

joining the materials at their surfaces;

allowing the adhesive composition to cure.

Said heating of the material can be performed after the application of the adhesive composition, as described, but it may also be performed prior to the application of the adhesive.

Heating can be performed using conventional heat sources known to those skilled in the art. In practice, however, the use of infrared light (e.g. 250 W, Osram) has been found to be particularly advantageous.

Reproducible tensile shear strengths are obtained, for instance, when the irradiation time of 30–60 s is correlated with the distance of the lamp (5–20 cm) and the absorption properties of the test specimens to be bonded (e.g. aluminum, steel, PVC, PC, ABS, etc.). The lamp must be adjusted such that the temperature of the test specimens is increased to 20–80° C., preferably 25–50° C., during the irradiation time. In addition to a reduction of the air contact time, faster curing of the adhesive is also observed while its characteristics remain the same.

Figure 1:
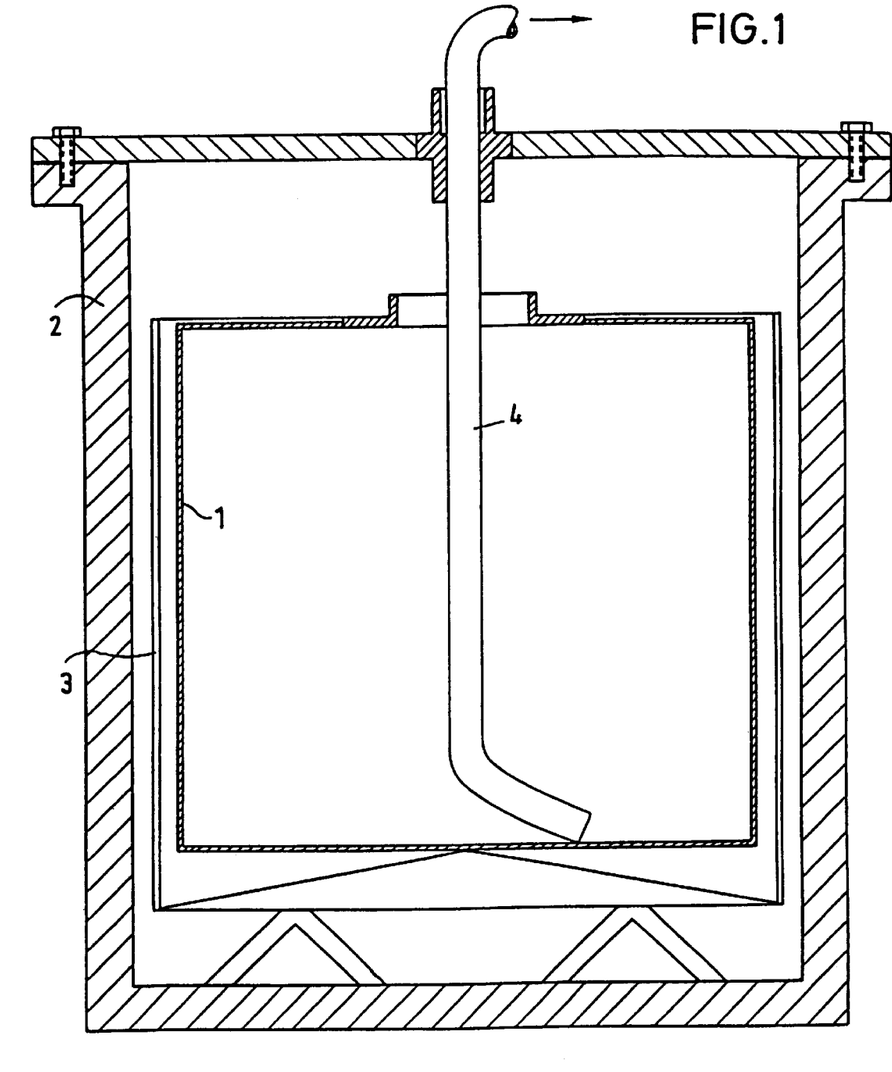
FIG. 1 shows a container for storing and metering anaerobic adhesives according to the prior art in which a flexible PE container 1 is suspended in a compressed air container 2 by means of a fixture 3. Suspended in container 1 is an ascending pipe 4 through which the product is pressed out of the container. Further, appropriate hose pipes and/or distributing valves can be provided at the ascending pipe.
Figure 2:
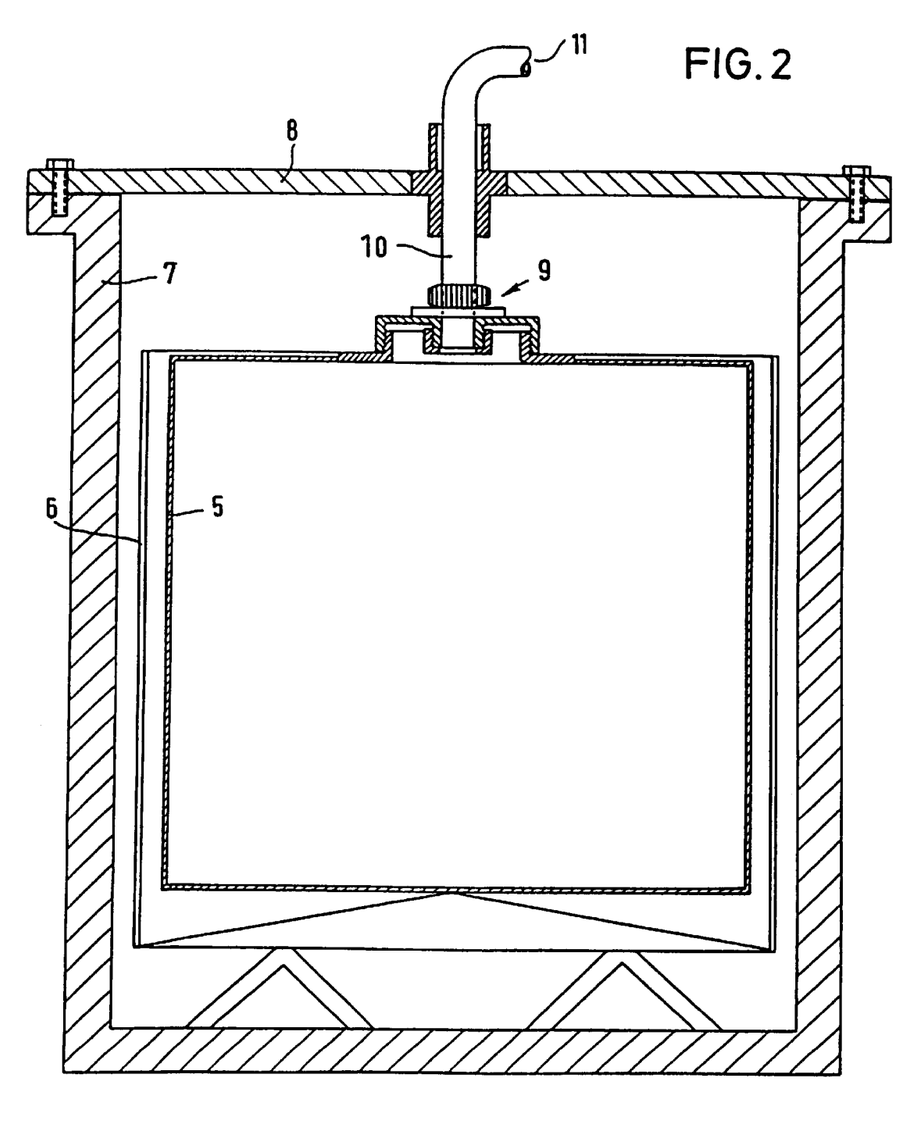
Figure 3:
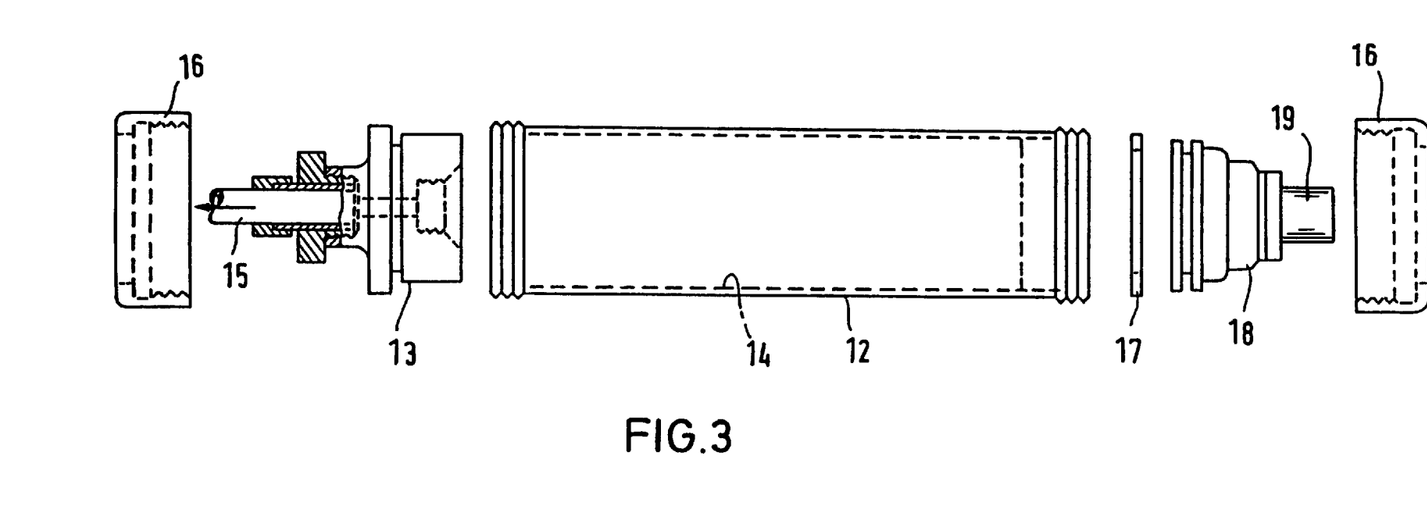
FIG. 3 shows a pneumatic squeezing unit consisting of a tube 14 inserted in a cartridge 12 and provided with a special tube adapter 13. Tube 14 contains the aerobic rigid foam adhesive. To tube adapter 13, there can be fitted a product hose or tube 15 through which the adhesive is delivered. This can again be provided with a distributing valve. Tube adapter 13 is connected and sealed to cartridge 12 through its fitted thread and by means of a cap nut 16. At the other end of cartridge 12, there are the connections for admitting compressed air into cartridge 12, consisting of a seal 17, a pressure controller 18, and the connection for compressed-air line 19. This end of the cartridge is also sealed by means of a cap nut 16.

Of course, the adhesive itself may also be heated instead of the material. This is done conveniently by heating the metering tip. The present invention further pertains to the use of the composition according to the invention in a system for storing and metering said composition, consisting of a flexible container (5,14) made of an air-impermeable material;

a product outlet attached thereto and a distributing valve;

a pressure tank (7,12) enclosing the flexible container and provided with a product passage opening;

optionally connections for admitting compressed air into the pressure tank which are attached thereto;

controlling devices and metering means;

wherein the reactive adhesive composition is contained in the flexible container (5,14).

This arrangement ensures that no atmospheric oxygen from the environment or from the compressed air will enter the flexible, oxygen-impermeable plastic container.

According to one embodiment of the system, the flexible plastic container is placed or suspended in the pressure tank by means of a fixture. Thus, collapsing of the container is prevented. The connection between the container and the container lid is made with a screwable adapter. A direct seal towards the compressed air and the environment is achieved thereby. The otherwise usual screw joints, hoses and valves can still be fitted at the product container outlet.

For working the adhesives and sealants without any problems, the appropriate plastic container must be selected depending on the curing mechanism. Air-activatable adhesives must be metered from oxygen-impermeable plastic containers (e.g. EVAL F).

In another embodiment, the system is comprised of a tube made of an air-impermeable material (e.g. Al) containing the aerobic adhesive. The tube is provided with the appropriate threads to be screwed to an adapter for product outflow. The tube provided with the adapter is then inserted into a cartridge container to which compressed air can be admitted.

In a special example, activation of the metering valve is made electropneumatically with a metering device (DG-combi 1.5 bar, DS 1 DS-compact; Lang). A 310 ml cartridge pressure tank (Type Winchester; Cox) is used. The adapter (material: POM) is inserted as a transition piece between the tube and the product hose. The female thread of the adapter must be matched to the male thread of the tube. In addition, the adapter forms the seal towards the storage pressure tank. The product hose and the tube must be matched to the adhesive to be worked (aerobic adhesives, oxygen-impermeable). The metering valves are pneumatically activated diaphragm valves (drop and caterpillar applications), volumetric metering valves and spraying valves for adhesive application on large surface areas.

The present invention will be described in more detail by the following examples, however, without being limited thereto.

EXAMPLE

I) Preparation of the Polyester Diols

Example 1

446.6 g of dimerdiol (hydrogenated dimer fatty acid) and 60 g of succinic anhydride are heated at 185° C. together with 50 g of xylene and 0.5 g of Sn(II) octoate on a water separator for 7 hours. Subsequently, the xylene is distilled off in a water-jet vacuum while the bath temperature is increased up to 210° C. The product thus obtained has an acid number (AN) of 0.9 and an OH number (OHN) of 47, corresponding to an average molecular weight of 2400. Composition: C 78.53%; H 12.08%; 0 9.39%; C:O=8.36; C:H=6.5

Example 2

446.6 g of dimerdiol, 70 g of succinic anhydride and 0.5 g of Sn(II) octoate are reacted in analogy to example 5. The resulting polyesterdiol has an AN of 1.7, an OHN of 25, and an average molecular weight of 4500. Composition: C 78.19%; H 11.92%; O 9.89%; C:O=7.9; C:H=6.56

Example 3

97.5 g of hexanediol and 400.7 g of dimer fatty acid VD 288 are heated at 195° C. together with 100 g of xylene and 0.5 g of Sn(II) octoate on a water separator for 7 hours. Subsequently, the xylene is distilled off. The resulting polyesterdiol has an AN of 0.1, an OHN of 19.1, and an average molecular weight of 5900. Composition: C 77.62%; H 12.15%; O 10.23%; C:O=7.6; C:H=6.4

Example 4

97.5 g of hexanediol-1,6 and 343.5 g of dimer fatty acid are reacted in analogy to example 7. The polyesterdiol has an AN of 0.3, an OHN of 55, and an average molecular weight of 2000. Composition: C 76.99%; H 12.14%; O 10.88%; C:O=7.08; C:H=6.34

Example 5

118.2 g of hexanediol, 626 g of polyethylene glycol (MW 600) and 858 g of dimer fatty acid are reacted in analogy to examples 7 and 8. The polyesterdiol has an AN of 1.2, an OHN of 37, and an average molecular weight of 3000. Composition: C 68.5%; H 10.78%; O 20.73%; C:O=3.3; C:H=6.35

Example 6

446.6 g of dimerdiol, 84.9 g of diethylene glycol, 140.1 g of succinic anhydride and 0.7 g of Sn(II) octoate are reacted in analogy to examples 5 and 6. The resulting polyesterdiol has an AN of 2.0, an OHN of 31, and an average molecular weight of 3200. Composition: C 71.94%; H 10.73%; O 17.33%; C:O=4.15; C:H=6.7

Example 7

718 g (1.33 mol) of dimerdiol, 570 g (1 mol) of dimer fatty acid and 0.6 g of Sn(II) octoate are heated to 150° C. Within 6 hours, the temperature is increased to 225° C. while a vacuum of 1.333 kPa (10 Torr) is applied from the 2nd hour on. After 6 hours, heating is performed at 240° C. for another 8 hours in an oil pump vacuum. After the reaction is completed, the polyesterdiol obtained has an acid number of 0.5, an OH number of 31, and an average molecular weight of 36,000. Composition: C 81.2%; H 12.77%; O 6%; C:O=13.5; C:H=6.36

II) Preparation of the Polyurethane Methacrylates (PUMA)
General Preparation Protocol 0.2 moles of a polyester diol is heated to 45° C. In the course of 5 min, 0.4 moles of a diisocyanate, e.g. Desmodur T 100 (2,4-toluenediisocyanate (TDI), commercial product of Bayer, Leverkusen), is added while the temperature is kept at maximally 55° C. Heating is continued for another 15 min at 55–60° C. until the NCO content of the mixture has reached 50% of its initial value. Then, 0.2 moles of hydroxypropyl methacrylate (HPMA) is added and the mixture is heated at 80° C. until the NCO content has decreased to below 0.1%. An 80% solution of the PUMA in excess HPMA results.

III) General Preparation Protocol for One-Ccomponent Reactive Adhesives 37.5 weight parts of methacrylate monomer, 62.5 weight parts of PUMA, 0.5 weight parts of JPA 514, 1 weight part of iron(III) acetylacetonate, and 0.1 weight parts of sodium iodide are homogenized in a stirring apparatus, evacuated and then aerated with nitrogen. In order to exclude oxygen completely, this procedure is repeated twice. Then, 3 weight parts of acetophenone tert.-butylhydrazone are added in a nitrogen countercurrent, and the mixture is again evacuated with stirring and aerated with nitrogen.

Acetophenone methylhydrazone may be used instead of the corresponding tert.-butylhydrazone.

IV) Preparation of Polyurethane Methacrylates

A) Polyurethane methacrylate mixtures based on polycaprolactone-doil and -triol

Educts 540 g (1 mol) of polycaprolactonetriol, MW 540 (CAPA 305, commercial product of Solvay)

1376 g (0.65 mol) of polycaprolactonediol, MW 2000 (CAPA 220, commercial product of Solvay)

748 g (4.3 mol) of 2,4-toluenediisocyanate (Desmodur T 100, commercial product of Bayer)

1.23 g (9.9 mol) of hydroxypropyl methacrylate (HPMA 97, commercial product of Röhm)

1.23 g of hydroquinone monomethyl ether (commercial product of Fluka)

Preparation protocol

The polyols are charged into a stirring apparatus and heated to 50° C. The toluene diisocyanate (TDI) is added dropwise in the course of 30 min while the temperature of the mixture does not exceed 55° C. After completion of the addition, heating is perfromed for 45 min at 60° C. until the NCO content has reached a value of 6.8%. The hydroquinone monomethyl ether and the HPMA added and the mixture heated at 80° C. until the NCO content has become<0.1%. The reaction product is an 80% solution of the polyurethane (meth)acrylate in (excess) HPMA.

b) polyurethane methacrylate based on polytetrahydrofurfuryldiol:

767 g of polytetrahydrofurfuryldiol having a molecular weight of 650 is charged into a stirring apparatus and heated to 50 ° C. 150 g of 4,4'-diisocyanatodiphenylmethane (Desmodur 44 M, commercial product of Bayer AG) is added and the mixture is heated at 90° C. until the NCO content equals 0. Then, 209 g of 2,4-toluenediisocyanate (Desmodur T, commercial product of Bayer AG) is added and the reaction mixture is heated at 60° C. for one hour until the theoretical NCO content of 4.5 has been reached. 173 g of hydroxypropyl methacrylate is added and the mixture is heated at 80° C. until the NCO content has become<0.1%.

V) Properties of the Aerobic Adhesive Compositions

The following adhesive compositions are prepared:

1) 40% by weight of benzyl methacrylate 12% by weight of hydroxypropyl methacrylate 48% by weight of polyurethane methacrylate according to IVa)

2) 40% by weight of tetrahydrofurfuryl methacrylate 12% by weight of hydroxypropyl methacrylate 48% by weight of polyurethane methacrylate according to IVa)

3) 15% by weight of benzyl methacrylate 37% by weight of hydroxypropyl methacrylate 48% by weight of polyurethane methacrylate according to IVa)

4) 25% by weight of benzyl methacrylate 27% by weight of hydroxypropyl methacrylate 48% by weight of polyurethane methacrylate according to IVa)

5) 52% by weight of hydroxypropyl methacrylate 48% by weight of polyurethane methacrylate according to IVb)

All of these base mixtures additionally contain acetophenone tert.-butylhydrazone as an initiator as well as conventional additives.

The compositions were examined with respect to their bonding properties when the same and different substrates (composite bondings) were bonded (DIN 53281, 53282 and 53283). Three drops of the adhesive composition (about 60 mg) were applied to one side of the substrate which was joined after the air contact time (ACT, in minutes).

The measured values stated are mean values which were established from at least 5 measurements. "CB" means cohesion break, "MB" means material break. The times stated for storage refer to the storage times of the bonded substrates. The results are listed in the following tables 1 and 2.

TABLE 1

Suitability as an adhesive
In each of the following examples, composition 1) (stored at room temperature for 6 weeks) has been employed.

|  | N (mean value) | N/mm² (mean value) | break | curing |
|---|---|---|---|---|
| aluminum: sandblasted (after 72 h storage) standard deviation: | 3630 ± 101.5 | 14.5 ± 0.4 | CB | o.k. |
| steel: sandblasted (after 3 h storage at 80° C.) standard deviation: | 54.88 ± 117.5 | 22.0 ± 0.5 | CB | o.k. |
| steel: sandblasted (after 72 h storage) standard deviation: | 4946 ± 229.7 | 19.8 ± 0.9 | CB | o.k. |
| steel: sandblasted (after 72 h storage + 3 h at 80° C.) standard deviation: | 4514 ± 316.0 | 18.1 ± 1.3 | CB | o.k. |
| ABS: smooth (after 72 h storage) standard deviation: | 2350 ± 94.4 | 9.4 ± 0.4 | MB |  |
| PVC: smooth (after 72 h storage) standard deviation: | 1968 ± 231.2 | 7.9 ± 0.9 | MB |  |
| PC: smooth (after 72 h storage) standard deviation: | 1870 ± 166.4 | 7.5 ± 0.7 | MB |  |
| composite bonding: steel: sandblasted/ ABS: smooth (after 3 h storage at 80° C.) standard deviation: | 3750 ± 149.8 | 11.0 ± 0.6 | CB | o.k. |
| composite bonding: steel: sandblasted/ PVC: smooth (after 3 h storage at 80° C.) standard deviation: | 2272 ± 334.0 | 9.1 ± 1.3 | MB | o.k. |
| composite bonding: steel: sandblasted/ PC: smooth (after 3 h storage at 80° C.) standard deviation: | 2356 ± 504.1 | 9.0 ± 2.0 | MB | o.k. |
| composite bonding: aluminum: sandblasted/ ABS: smooth (after 3 h storage at 80° C.) standard deviation: | 1991 ± 163.3 | 8.0 ± 0.6 | CB | o.k. |
| composite bonding: aluminum: sandblasted/ PVC: smooth (after 3 h storage at 80° C.) standard deviation: | 2118 ± 113.7 | 8.5 ± 0.4 | CB | o.k. |
| composite bonding: aluminum: sandblasted/ PVC: smooth (after 3 h storage at 80° C.) standard deviation: | 1738 ± 183.1 | 7.0 ± 0.7 | CB | o.k. |
| composite bonding: steel: sandblasted/ ABS: smooth (after 72 h storage at RT) standard deviation: | 2438 ± 190.4 | 9.8 ± 0.8 | CB | o.k. |
| composite bonding: | 2118 ± | 8.5 ± | MB-PVC | o.k. |

TABLE 1-continued

Suitability as an adhesive
In each of the following examples, composition 1) (stored at room temperature for 6 weeks) has been employed.

|  | N (mean value) | N/mm² (mean value) | break | curing |
|---|---|---|---|---|
| steel: sandblasted/ PVC: smooth (after 72 h storage at RT) standard deviation: | 144.3 | 0.6 |  |  |
| composite bonding: steel: sandblasted/ PC: smooth (after 72 h storage at RT) standard deviation: | 2308 ± 403.8 | 9.2 ± 1.6 | MB-PC |  |
| composite bonding: aluminum: sandblasted/ ABS: smooth (after 72 h storage at RT) standard deviation: | 1498 ± 177.2 | 6.0 ± 0.7 | CB | o.k. |
| composite bonding: ABS: smooth/ PVC: smooth (after 72 h storage at RT) standard deviation: | 2366 ± 88.2 | 9.5 ± 0.4 | MB-ABS |  |
| composite bonding: ABS: smooth/ PC: smooth (after 72 h storage at RT) standard deviation: | 2010 ± 144.5 | 8.0 ± 0.6 | MB-PC |  |
| composite bonding: PVC: smooth/ PC: smooth (after 72 h storage at RT) standard deviation: | 2352 ± 326.8 | 9.4 ± MB | MB |  |

TABLE 2

Test for gap-bridging property and ageing resistance (heat resistance, testing under humid and changing climatic conditions)
The compositions employed in the following were stored at room temperature for 6 weeks.

|  | N (mean value) | N/mm² (mean value) | break | curing |
|---|---|---|---|---|
| composition 1) steel: sandblasted (after 96 h storage at RT) gap: 0.10 mm standard deviation: | 4304 ± 205.1 | 17.2 ± 0.8 | CB | o.k. |
| composition 2) steel: sandblasted (after 96 h storage at RT) gap: 0.10 mm standard deviation: | 3282 ± 327.0 | 13.1 ± 1.3 | CB | o.k. |
| composition 1) steel: sandblasted (after 96 h storage at RT + 14 days storage at 100° C.) standard deviation: | 5936 ± 860.4 | 23.7 ± 3.4 | CB | o.k. |
| composition 2) steel: sandblasted (after 96 h storage at RT + 14 days storage at 100° C.) standard deviation: (tested at RT) | 4704 ± 451.9 | 18.8 ± 1.8 | CB | o.k. |
| composition 1) steel: sandblasted (after 96 h storage at RT + 5 days storage at 40° C., 99% humidity) standard deviation: | 3300 ± 424.3 | 13.2 ± 1.7 | CB | o.k. |

TABLE 2-continued

Test for gap-bridging property and ageing resistance (heat resistance, testing under humid and changing climatic conditions) The compositions employed in the following were stored at room temperature for 6 weeks.

| | N (mean value) | N/mm² (mean value) | break | curing |
|---|---|---|---|---|
| composition 2) steel: sandblasted (after 96 h storage at RT + 5 days storage at 40° C., 99% humidity) standard deviation: | 2604 ± 453.6 | 10.4 ± 1.8 | CB | o.k. |
| composition 1) steel: sandblasted (after 96 h storage at RT + 10 days storage at 40° C., 99% humidity) standard deviation: | 3062 ± 447.0 | 12.2 ± 1.8 | CB | o.k. |
| composition 2) steel: sandblasted (after 96 h storage at RT + 10 days storage at 40° C., 99% humidity) standard deviation: | 2604 ± 7.68 | 11.8 ± 0.4 | CB | o.k. |

VI) Reduction of Air Contact Time By Heating the Test Specimens

For the following experiments, about 60 mg of the adhesive composition 1) was applied to one side of each of the specimens, irradiated with an infrared lamp (Osram, 250 W) at a distance of 13 cm for one minute, whereby the specimen was heated at 40–50° C. at the site where to adhesive had been applied. Then, joining was performed and measurements at the bonded joints were carried out after different periods of storage at room temperature. The values stated for tensile shear strength are again mean values from at least 5 individual measurements. "s.w." means slightly wet. The results are listed in the following table 3.

TABLE 3

| | N (mean value) | N/mm² (mean value) | break | curing |
|---|---|---|---|---|
| steel: sandblasted (after 15 min storage) standard deviation: | 1878 ± 492.7 | 7.5 ± 2.0 | CB | s.w. |
| steel: sandblasted (after 30 min storage) standard deviation: | 2604 ± 255.5 | 10.4 ± 1.0 | CB | s.w. |
| steel: sandblasted (after 60 min storage) standard deviation: | 3485 ± 126.6 | 13.9 ± 0.5 | CB | s.w. |
| steel: sandblasted (after 120 min storage) standard deviation: | 3700 ± 258.1 | 14.8 ± 1.0 | CB | o.k. |
| steel: sandblasted (after 180 min storage) standard deviation: | 3770 ± 367.3 | 15.1 ± 1.5 | CB | o.k. |

VII) System for Storing and Metering Aerobic One-Component Adhesives a) Flexible, air-impermeable plastic container (placed or suspended in pressure tank by means of fixture)—metering of the adhesive Using the above-described metering system, 2 kg of adhesive were metered from an EVAL soft container (3 l) in the course of 36 h. The mass of the residual content was determined by difference weighing and found to be 8 g (4%). In addition, the storage stability was determined in the course of 4 weeks at a constant pressure of 2 bar. An increase in viscosity in the subsequent metering was not detected.

b) Automatic metering of aerobic adhesives from tubes stored in cartridges.

A 200 g aluminum tube charged with an aerobically curing reactive adhesive (viscosity: 1000–1500 mPa.s) is screwed in the adapter and sealed. Thus, contact with atmospheric oxygen is precluded. Then, the tube with the adapter is inserted into the cartridge container. A screwed joint at the outlet side to the oxygen-impermeable product hose (polyurethane 4×1 mm and 2×1 mm, Festo) provides direct sealing of the product towards compressed air and ambient air. The product-contacting parts of the valve are made of PTFE. Impulse triggering or application can be performed by a pistol grip, foot switch or external make contact (potential-free).

What is claimed is:

1. An aerobically-curing adhesive composition comprising:

A) a hydrazone initiator system;

B) at least one polyurethane (meth) acrylate compound of the general formula wherein:

R¹ is hydrogen or a methyl group;

R² is selected from the group consisting of linear or branched chain alkylene groups containing from 2 to 6 carbon atoms and polyoxyalkylene groups containing from 4 to 21 carbon atoms;

n is 2 or 3, provided that when n is 2, R³ is:

wherein m is from 0 to 10; and

R⁴ is selected from the group consisting of:

a) a polycaprolactonediol residue;

b) a polytetrahydrofurfuryldiol residue;

c) a diol residue derived from a polyesterdiol which is characterized by a weight ratio of carbon to oxygen of greater than 2.6, a weight ratio of carbon to hydrogen of less than 10, and a molecular weight of from 1000 to 20,000; and d) a diol residue derived from a polyesterdiol which is liquid at 20° C. and has a molecular weight of from 4000 to 10,000; and provided further that when n is 3, R³ is:

wherein R⁵ is a triol residue of a linear or branched chain trihydric alcohol containing from 3 tO 6 carbon atoms, and p is from 1 to 10; and Q and Q' independently are aromatic, aliphatic or cycloaliphatic groups containing from 6 to 18 carbon atoms which are derived from a diisocyanate or diisocyanate mixtures; and C) one or more comonomers selected from the group consisting of acrylate esters and methacrylate esters; wherein said composition contains from 20 to 80% by weight of said polyurethane (meth) acrylate compound and from 80 to 20% by weight of said comonomers, based on the total weight of polymerizable compounds in said composition.

2. The composition according to claim 1 wherein said composition contains from 20 to 70% by weight of said polyurethane compound and from 80 to 30% by weight of said (meth)acrylate comonomer, based on the total weight of polymerizable compounds in said composition.

3. The composition according to claim 1 wherein $R^2$ is selected from ethylene, propylene, i-propylene, n-butylene, i-butylene, polyoxyethylene, and polyoxprolylene group.

4. The composition according to claim 1 wherein Q and Q' are independently derived from diisocyanates which are selected from the group consisting of 2,4-toluenediisocyanate, 2,6-toluenediisocyanate, 4,4'-diphenylmethanedi isocyanate, 4,4'-dicyclohexyldiisocyanate, meta- and para-tetramethylxylenediisocyanate, 3-isocyanatomethyl-3,5,5-trimethylcyclohexylisocyanate, hexamethylenediisocyanate, 1,5-naphthylenediisocyanate, dianisidinediisocyanate, bis(2-isocyanatoethyl)bi-cyclo [2.2.1]hept-5-ene-2,3-dicarboxylate, 2,2,4- and 2,4,4-trimethylenehexamethylenediisocyanate, and mixtures thereof.

5. The composition according to claim 1 wherein said comonomer is selected from the group consisting of allyl acrylate, allyl methacrylate, methyl acrylate, methyl methacrylate, 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, 6-hydroxyhexyl acrylate, 6-hydroxyhexyl methacrylate, benzyl methacrylate, phenylethyl methacrylate, 2-phenoxyethyl methacrylate, morpholinoethyl methacrylate, glycidyl methacrylate, piperidylacrylamide, neopentyl methacrylate, cyclohexyl methacrylate, tert.-butyl methacrylate, and tetrahydrofurfuryl methacrylate, and mixtures thereof.

6. The composition according to claim 1 wherein n is 2 and $R^4$ is a polycaprolactonediol residue.

7. The composition according to claim 1 wherein n is 2 and $R^4$ is a polytetrahydrofurfuryidiol residue.

8. The composition according to claim 1 wherein n is 2 and $R^4$ is a diol residue derived from a polyesterdiol which is characterized by a weight ratio of carbon to oxygen of greater than 2.6, a weight ratio of carbon to hydrogen of less than 10, and a molecular weight of from 1000 to 20,000.

9. The composition according to claim 1 wherein n is 2 and $R^4$ is a diol residue derived from a polyesterdiol which is liquid at 20° C. and has a molecular weight of from 4000 to 10,000.

10. The composition according to claim 1 wherein n is 3.

11. The composition according to claim 1 wherein n is 2 and $R^4$ is selected from the group consisting of:
a) a polycaprolactonediol residue;
b) a polytetrahydrofurfuryldiol residue; and
c) a diol residue derived from a polyesterdiol having a weight ratio of carbon to oxygen of greater than 2.6, a weight ratio of carbon to hydrogen of less than 10, and a molecular weight of from 1000 to 20,000.

12. The composition according to claim 1 wherein said hydrazone initiator system is comprised of a hydrazone compound and a metallic compound which is a least partially soluble in said composition.

13. The composition according to claim 1 wherein said hydrazone initiator system is comprised of a hydrazone compound having the formula:

wherein:

$R^{10}$ is a linear, branched chain or cyclic alkyl residue which may be substituted or an aryl residue which may be substituted;

$R^6$ may be the same as $R^{10}$ or different and is hydrogen, a linear, branched chain or cyclic alkyl residue which may be substituted or an aryl residue which may be substituted, provided that $R^{10}$ and $R^6$ may also, together with the adjacent carbon atom to which they are bound, form a cycloaliphatic residue which may be substituted; and $R^7$ is a linear, branched chain or cyclic alkyl residue which may be substituted or an aryl residue which may be substituted.

14. The composition according to claim 1 wherein said hydrazone initiator system is comprised of a hydrazone compound having the formula:

wherein:

q is a number from 1 to 3;

$R^8$ is hydrogen or an alkyl group containing up to 40 carbon atoms; and $R^9$ is independent of the other substituents and is hydrogen or an aromatic or aliphatic group containing up to 40 carbon atoms.

15. The composition according to claim 14 wherein at least one of $R^8$ and $R^9$ is selected from the group consisting of linear alkyl groups containing from 3 to 8 carbon atoms and cyclic alkyl groups containing from 3 to 8 carbon atoms.

16. The composition according to claim 1 wherein the hydrazone initiator system is comprised of a member selected from the group consisting of acetophenone methylhydrazone and acetophenone t-butylhydrazone.

17. A composition according to claim 1 wherein said hydrazone initiator system is comprised of a metallic compound which is at least partially soluble in said composition, the metal being selected from the group consisting of copper, cobalt, vanadium, manganese and iron.

18. A composition according to claim 17 wherein said hydrazone initiator system is further comprised of a metallic component selected from the group consisting of compounds of lead, cerium, calcium, barium, zinc, and zirconium.

19. A composition according to claim 17 wherein said metallic compound is selected from the group consisting of naphthenates and acetylacetonates.

20. A composition according to claim 17 wherein said metallic compound is iron chloride.

21. A composition according to claim 17 wherein said hydrazone initiator system is further comprised of a reductive agent having accelerating action.

22. A composition according to claim 21, wherein said reductive agent is an alpha-hydroxyketone.

23. A composition according to claim 21 wherein said reductive agent is selected from the group consisting of butyroin, benzoin, and acetoin.

24. A composition according to claim 1 wherein said hydrazone initiator system makes up not more than about 15% by weight of said composition.

25. A composition according to claim 1 wherein said hydrazone initiator system makes up not more than about 10% by weight of said composition.

26. A composition according to claim 1 wherein said hydrazone initiator system makes up about 0.1% to about 0.5% by weight of said composition.

27. A composition according to claim 1 wherein said hydrazone initiator system makes up about 1% to about 8% by weight of said composition.

28. A composition according to claim 1, wherein said hydrazone initiator system is comprised of a hydrazone compound in an amount from 0.5% to 7.5% by weight of said composition, a metal of a soluble metallic compound in an amount from about 50 ppm to 1% by weight of said composition, and a reductive agent in an amount of up to 5% by weight of said composition.

29. A composition according to claim 1 wherein said hydrazone initiator system is comprised of a hydrazone compound in an amount from 1% to 4% by weight of said composition, a metal of a soluble metallic compound in an amount from 1000 to 5000 ppm by weight of said composition, and a reductive agent in an amount from 1% to 3% by weight of said composition.

30. An aerobically curing adhesive composition comprising:

A) a hydrazone initiator system;
B) at least one polyurethane (meth) acrylate compound of the general formula:

wherein:
R$^1$ is hydrogen or a methyl group;
R$^2$ is selected from the group consisting of ethylene, propylene, i-propylene, n-butylene, i-butylene, polyoxyethylene containing from 4 to 20 carbon atoms, and polyoxypropylene groups containing from 6 to 21 carbon atoms;
n is 2 or 3;
provided that when n is 2, R$^3$ is:

wherein
m is from 0 to 10; and
R$^4$ is selected from the group consisting of:
  a) a polycaprolactonediol residue:
  b) a polytetrahydrofurfuryldiol residue; and
  c) a diol residue derived from a polyesterdiol which is characterized by a weight ratio of carbon to oxygen of greater than 2.6, a weight ratio of carbon to hydrogen of less than 10, and a molecular weight of from 1000 to 20,000, and
provided further that when n is 3, R$^3$ is:

wherein
R$^5$ is a triol residue of a linear or branched chain trihydric alcohol containing from 3 to 6 carbon atoms, and p is from 1 to 10; and Q and Q' independently are aromatic, aliphatic or cycloaliphatic groups containing from 6 to 18 carbon atoms which are derived from a diisocyanate which is selected from the group consisting of 2,4-toluenediisocyanate, 2,6-toluenediisocyanate, 4,4'-diphenylmethanediisocyanate, 4,4'-dicyclohexyldiisocyanate, meta- and para-tetramethylxylenediisocyanate, 3-isocyanatomethyl-3,5,5-trimethylcyclohexylisocyanate, hexamethylenediisocyanate, 1,5-naphthylenediisocyanate, dianisidinediisocyanate, bis(2-isocyanatoethyl)bicyclo[2.2.1]hept-5-ene-2,3-dicarboxylate, 2,2,4- and 2,4,4-trimethylenehexamethylenediisocyanate, and mixtures thereof; and C) one or more comonomers selected from the group consisting of allyl acrylate, allyl methacrylate, methyl acrylate, methyl methacrylate, 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, 6-hydroxyhexyl acrylate, 6-hydroxyhexyl methacrylate, benzyl methacrylate, phenylethyl methacrylate, 2-phenoxyethyl methacrylate, marpholinoethyl methacrylate, glycidyl methacrylate, piperidylacrylamide, neopentyl methacrylate, cyclohexyl methacrylate, tertbutyl methacrylate, and tetrahydrofurfuryl methacrylate, and mixtures thereof:
wherein said composition contains from 20 to 70% by weight of said polyurethane (meth) acrylate compound and from 80 to 30% by weight of said comonomers, based on the total weight of polymerizable compounds in said composition.

31. A composition according to claim 30 wherein said hydrazone initiator system is comprised of a hydrazone compound selected from the group consisting of acetophenone methylhydrazone and acetophenone t-butylhydrazone, in an amount of 1% to 4% by weight of said composition, a metallic compound selected from the group consisting of a naphthenates and acetylacetonates of copper, cobalt, vanadium, manganese and iron, in an amount from 1000 to 5000 ppm by weight of said composition, and a reductive agent selected from the group consisting of butyroin, benzoin, and acetoin, in an amount from 1% to 3% by weight of said composition.

32. A process for preparing the composition according to claim 1 comprising homogenizing said polyurethane (meth) acrylate compound, said comonomer, and said hydrazone initiator system.

33. In a method for surface coating with a brushable agent, the improvement comprising applying to a surface as the brushable agent a composition as claimed in claim 1.

34. In a method for producing molded parts, the improvement comprising molding said parts with a composition as claimed in claim 1.

35. In a method of producing a printing ink, the improvement comprising adding to said printing ink a composition as claimed in claim 1.

36. A method for bonding materials comprising applying a composition as claimed in claim 1 to at least one of the material surfaces to be bonded, contacting said composition with atmospheric oxygen, joining the materials to be bonded at their surfaces, and allowing said composition to cure.

37. The method according to claim 36 further comprising heating the materials to be bonded at the surface provided with said composition during said contacting at a temperature of from 20 to 80° C.

38. The method according to claim 36 further comprising heating of the material surface to be bonded prior to said application of said composition.

39. The method according to claim 36 further comprising heating said composition prior to said applying.

40. The method according to claim 36 wherein said materials to be bonded are selected from metals, plastics, ceramics, glass, and cellulose-containing materials.

41. The method according to claim 36 wherein said materials to be bonded are loudspeaker components.

42. A method according to claim 36 wherein said applying employs a system for storing and metering said composition, said system consisting of:
a flexible container made of an air-impermeable material;
a product outlet attached to said flexible container and a distributing valve;

a pressure tank enclosing the flexible container and provided with product passage openings;

optionally connections for admitting compressed air into the pressure tank which are attached thereto; and controlling devices and metering means;

wherein said composition is contained in said flexible container.

43. The method according to claim 42 wherein said flexible container containing said composition is suspended in said pressure tank.

44. The method according to claim 42 wherein said flexible container containing said composition is a tube and said pressure tank is a cartridge.

* * * * *